United States Patent [19]

Mowdood

[11] 4,048,227
[45] Sept. 13, 1977

[54] N-(OXOPROPYL)AMIDE DERIVATIVES

[75] Inventor: Syed K. Mowdood, Akron, Ohio

[73] Assignee: The Goodyear Tire & Rubber Company, Akron, Ohio

[21] Appl. No.: 663,391

[22] Filed: Mar. 3, 1976

Related U.S. Application Data

[63] Continuation of Ser. No. 548,481, Feb. 10, 1975, abandoned, which is a continuation of Ser. No. 355,628, April 30, 1973, abandoned, which is a continuation of Ser. No. 159,046, July 1, 1971, abandoned.

[51] Int. Cl.$^2$ .................. C07C 103/42; C07C 103/62; C07C 103/80
[52] U.S. Cl. .............................. 260/562 P; 260/63 R; 260/557 R; 260/558 P; 260/559 R; 260/562 B; 260/562 A
[58] Field of Search ........... 260/559 R, 562 R, 558 P, 260/562 P, 562 A, 63 R

[56] References Cited

U.S. PATENT DOCUMENTS

| | | | |
|---|---|---|---|
| 3,277,056 | 10/1966 | Coleman | 252/51.5 A X |
| 3,341,455 | 9/1967 | Coleman | 252/51.5 A |
| 3,425,942 | 2/1969 | Coleman | 252/51.5 A |
| 3,518,326 | 6/1970 | Forsberg | 260/828 |
| 3,542,875 | 11/1970 | Raymond | 260/562 P |
| 3,839,415 | 10/1974 | Easton et al. | 260/558 R X |
| 3,936,479 | 2/1976 | Avar et al. | 260/562 P X |
| 3,959,224 | 5/1976 | Coleman | 260/562 P X |
| 3,998,997 | 12/1976 | Mowdood et al. | 260/63 R X |

*Primary Examiner*—Daniel E. Wyman
*Assistant Examiner*—Thomas A. Waltz

*Attorney, Agent, or Firm*—F. W. Brunner; H. C. Young, Jr.

[57] ABSTRACT

An amide particularly suitable as a light stabilizer and also for copolymerizing with other monomers, wherein said amide has the following structure:

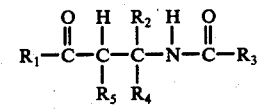

where $R_1$ is an aryl radical having the structure:

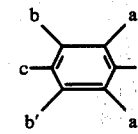

where $a$ and $a'$ are selected from hydrogen, hydroxyl and medium alkyl hydrocarbon radicals; $b$ and $b'$ are selected from hydrogen and medium to lower alkyl hydrocarbon radicals, and $c$ is selected from medium to lower alkyl hydrocarbon radicals, aryl ketone radicals, 2'-hydroxy aryl ketone radicals and 4'-octyl aryl ketone radicals; $R_4$ is selected from the aryl radicals of $R_1$ and from aliphatic hydrocarbon radicals having from 1 to 8 carbon atoms; $R_2$ is selected from hydrogen, methyl, ethyl, phenyl and —CH$_2$X radicals, where X is selected from chlorine, bromine or fluorine radicals; $R_3$ is selected from medium and lower alkyl, cycloalkyl and aryl radicals; and where $R_5$ is selected from hydrogen, methyl and chlorine radicals.

3 Claims, No Drawings

N-(OXOPROPYL)AMIDE DERIVATIVES

This is a continuation of application Ser. No. 548,481, filed Feb. 10, 1975, now abandoned, which is a continuation of application Ser. No. 355,628, filed Apr. 30, 1973, now abandoned, which is a continuation of application Ser. No. 159,046, filed July 1, 1971, now abondoned.

This invention relates to amides, polymers thereof and to methods for their preparation.

Aliphatic acrylamides are not normally used as light stabilizers since they are typically photolytic in the presence of ultraviolet light. That is, they typically tend to break down upon exposure by undergoing cleavage of the amide bond with resulting formation of various degradation products, such as amines and compounds containing carbonyl functions.

It is, therefore, an object of this invention to provide improved amides with various substituents, particularly aryl radicals, which are relatively photochemically and thermooxidatively stable, as well as useful homopolymers and interpolymers thereof with other ethylenically unsaturated monomers and amides containing aromatic chromophores such as acetophenone and benzophenone.

In accordance with this invention, it has been discovered that useful amides are provided having the structure:

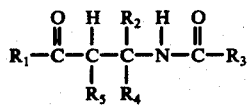

where $R_1$ is an aryl radical having the structure:

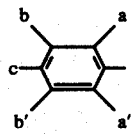

where $a$ and $a'$ are selected from hydrogen, hydroxyl and medium alkyl hydrocarbon radicals; $b$ and $b'$ are selected from hydrogen and medium to lower alkyl hydrocarbon radicals, and $c$ is selected from medium to lower alkyl hydrocarbon radicals, aryl ketone radicals, 2'-hydroxy aryl ketone radicals and 4'-octyl aryl ketone radicals; $R_4$ is selected from the aryl radicals of $R_1$ and from aliphatic hydrocarbon radicals having from 1 to 8 carbon atoms; $R_2$ is selected from hydrogen, methyl, ethyl, phenyl and —CH$_2$X radicals, where X is selected from chlorine, bromine or fluorine radicals, preferably chlorine; $R_3$ is selected from medium and lower alkyl, cycloalkyl and aryl radicals; and where $R_5$ is selected from hydrogen, methyl and chlorine radicals.

In the practice of this invention it is preferred that $R_1$ is a benzene ring ortho substituted with a hydroxyl radical, meta substituted with a medium alkyl radical and para substituted with an aryl ketone radical, particularly those selected from 2'hydroxy aryl ketone and 4'octyl aryl ketone radicals.

It is further preferred that $R_2$ is a methyl radical and $R_3$ is preferably a radical having the structure:

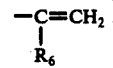

where $R_6$ is selected from hydrogen, methyl and chlorine radicals. It is preferred that both $R_5$ and $R_6$ are hydrogen radicals.

The term aryl ketone radical is used herein to describe radicals having the following structure:

where $R_7$ is an aromatic hydrogen radical, preferably a benzene ring ortho substituted with a hydroxyl radical or meta substituted with a medium alkyl radical such as an octyl radical.

Thus, aromatic acrylamides of this invention are preferred to have the following structure:

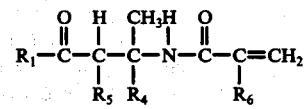

and even more preferably, the following structure:

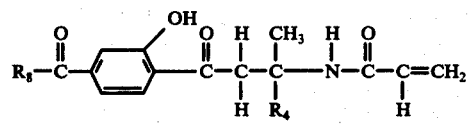

where $R_8$ is selected from 2'hydroxy aryl and 2'hydroxy-8'octyl aryl radicals.

In the description of this invention, the terms medium alkyl and lower alkyl radicals are used to describe saturated alkyl radicals, preferably straight chain radicals, containing 4 to 8 and 1–4 carbon atoms, respectively. The lower cycloalkyl radicals are saturated radicals having 3 to 16, preferably 3 to 6, carbon atoms and the lower aryl radicals contain 6 to 21, preferably 6 to 13, carbon atoms. Representative of the various substituent alkyl radicals are methyl, ethyl, the propyl, the butyl, the pentyl, the hexyl, the heptyl, the octyl, the nonyl and the dodecyl radicals; representative of the lower cycloalkyl radicals are cyclopropyl, cyclopentyl, cyclohexyl, cyclooctyl, and cyclononyl radicals; representative of the lower aryl radicals are phenyl, benzyl and alkyl substituted phenyl such as para octyl phenyl or substituted benzyl, such as biphenyl and benzophenone radicals. The aryl ketone radicals are essentially unsubstituted except where otherwise specifically required in $R_1$.

Representative of the various amides of this invention are acrylamides and acetamides, such as N-(1,3-diphenyl-3-oxopropyl)acrylamide, N-(3-oxo-1,2,3-triphenyl propyl)acrylamide, N-(1,3-diphenyl-2-methyl-3-oxopropyl)acrylamide, N-(2-chloro-1 -chloromethyl-1,3-diphenyl-3-oxo-propyl)acrylamide, N-(1,3-diphenyl-1-methyl-3-oxo-propyl)benzamide, N-(1,3-diphenyl-1-methyl-3-oxo-propyl)4'-(salicyloyl)benzamide, N-(1,3-diphenyl-1-methyl-3-oxo-propyl)acetamide, N-(1,3-diphenyl-1-methyl-3-oxopropyl)acrylamide, N-[1,3-bis(4-salicyloyl phenyl)-3-oxo-propyl] acrylamide, N-

(1,3-diphenyl-1-methyl-3-oxo-propyl)methacrylamide, N-(1,3-diphenyl-1-methyl-3-oxo-propyl) chloro acrylamide and N-(1,3-di-ortho hydroxy-phenyl-1-methyl-3-oxo-propyl)acrylamide.

More preferred are the N-(1,3-diphenyl-1-methyl-3-oxo-propyl)4'(salicyloyl)benzamide, N-(1,3-diphenyl-1-methyl-3-oxo-propyl)acetamide (also referred to as diacetophenone acetamide), N-(1,3-diphenyl-1-methyl-3-oxo-propyl)acrylamide (also referred to as diacetophenone acrylamide), N-[1,3-bis(4-salicyloyl phenyl)-3-oxo-propyl] acrylamide, and N-(1,3-di-ortho hydroxy phenyl-1-methyl-3-oxo-propyl)acrylamide. The diacetophenone acetamide and diacetophenone acrylamide are particularly preferred.

In the practice of this invention the various acrylamides and acetamides are prepared by reacting in the presence of an acid, either an acrylonitrile or substituted acrylonitrile with an aromatic ketone, or aromatic-aliphatic ketone, the precursor for the $R_1$ and $R_4$ radicals, or, if it is desired that $R_4$ be an aliphatic ketone radical, then a mixture of aromatic and aliphatic ketones can be used.

Various acids can be used for this process, representative of which are mineral acids such as sulfuric acid, hydrochloric acid, nitric acid and organic acids, such as p-toluene sulfonic acid, chloro sulfonic acid and benzene sulfonic acid. It is preferable to use a concentrated mineral acid such as sulfuric acid.

In the practice of this invention, various aromatic ketones can be used, representative of which include those having the formulae selected from:

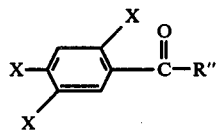
(A)

and

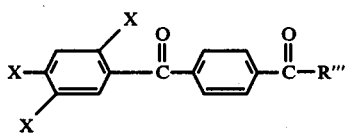
(B)

where R" and R"' are selected from saturated alkyl radicals having 1 to 6 carbon atoms having a maximum of one branch chain to the carbon atom alpha to the keto group; and where x represents radicals for either mon- or disubstitution of the benzene ring selected from hydrogen, hydroxyl and straight or branched chain saturated alkyl radicals, having from 1 to 14 carbon atoms.

Representative of the various aromatic ketones are benzyl methyl ketone, propiophenone, phenacyl chloride, phenacyl bromide, 2-phenyl butan-3-one, ortho-/para hydroxyphenyl methyl ketone, benzylidene acetone, methyl styryl ketone, benzal acetophenone, p-phenyl acetophenone, 1-acetyl-2'-hydroxy benzophenone, 1-acetyl-4'-octyl benzophenone, 1-acetyl-2'-hydroxy-4'-octyl benzophenone, ortho-hydroxy-p-octyl acetophenone, 3-octyl-2-hydroxy acetophenone and 1-(naphthyl)-2-propanone. Acetophenone and dypnone are the preferred aromatic ketones since they can be used to prepare the preferred diacetophenone acrylamide from acrylonitrile.

If desired, a small amount of aliphatic ketones can be mixed with the aromatic ketones or ketones having both aliphatic and aromatic radicals can be used, such as dypnone. However, the mixture is required to contain a sufficient amount of aromatic ketone to enable $R_1$ to be a phenyl, substituted phenyl or ketone-type aryl radical derived from the aromatic ketone. Usually a maximum of about 30 mole percent of aliphatic ketones can be used based on the total amount of ketones although in some instances, a maximum of about 50 mole percent can be tolerated. In other words, such a mixture can be required to consist of a minimum of about 50 mole percent of the aromatic ketone although it is typically required to contain at least about 70 mole percent. Thus, the method of preparation can comprise reacting in the presence of an acid the acrylonitrile and compounds selected from the group consisting of aromatic-aliphatic ketones and a mixture comprising about 50 to about 100 mole percent aromatic ketones and correspondingly up to about 50 mole percent aliphatic ketones.

Representative examples of the various aliphatic ketones are acetone, methyl ethyl ketone, diethyl ketone, beta hydroxy heptanone, methyl isobutyl ketone, diisobutyl ketone, methyl isoamyl ketone, cyclohexyl methyl ketone, cyclobutyl methyl ketone and cyclopentyl methyl ketone.

The reaction of the ketone or mixture of ketones with the acrylonitrile can be carried out over a wide temperature range such as from about −10° C. to about 100° C. although at higher temperatures undesirable side reactions can occur, such as polymerization of the acrylonitrile or actually the polymerization of the aromatic acrylamide product. A more preferable temperature for the reaction is in the range of from about 0° C. to about 70° C.

The reaction can be carried out at atmospheric pressure or above or below atmospheric pressure. A suitable pressure is the autogeneous pressure of the reaction system.

It is understood that the reaction can be carried out batchwise or on a continuous basis. It is usually desired that a reactor fitted with a mixer and a cooling system be used since the reaction itself is exothermic and heat must be carried away to provide an efficient process.

The resulting aromatic acrylamide can be suitably purified by distillation under a reduced pressure by crystallization from common organic solvents such as ethyl acetate, ethanol, isopropanol and toluene or by precipitation in hydrocarbon solvents, such as hexane and petroleum ether. Usually the product is of sufficient purity for general purposes that a purification step may not be necessary. Since the aromatic acrylamide may be susceptible to homopolymerization under relatively extreme conditions, purification or storage of the product can be made in the presence of a polymerization inhibitor such as, for example, hydroquinone.

The amides of this invention typically have particular utility as light stabilizers. Their homopolymers and various copolymers with other materials have demonstrated good heat distortion characteristics and relatively high second glass transition temperatures. The typical resistance of the acrylamides and acetamides of this invention to ultraviolet photolysis particularly enhances their utility in the field of light stabilization since they are resistant to breaking down in the presence of ultraviolet light. Their usefulness is, therefore, extended to additives to various materials for stabilizing them in the presence of ultraviolet light. The amides also generally enhance the adhesive properties of hot melt, pressure sensitive and structural adhesives.

The amides of this invention generally have utility as additives in various paints, fuels, lubricants and other polymers. For example, they can be used to enhance various curatives for such materials and also they can be used to provide photochemical stability. They are particularly useful in providing photochemical stability for polyvinylchloride. Diacetophenone acrylamide improves the heat distortion as a copolymer when copolymerized with acrylonitrile, and of terpolymers based on acrylonitrile, acrylates and diacetophenone acrylamide. In general, the diacetophenone acrylamide raises the glass transition temperature and heat distortion of polymers made from compatible monomers.

Where the amides are to be used as additives for providing photochemical stability to various polymers, it is usually preferred that they are present in the polymer composition in an amount of from about 0.1% up to about 2%, and preferably from about 0.5% to about 1% by weight.

The aromatic acrylamides can be homopolymerized or copolymerized with the various comonomers under various conditions and in the presence of various free radical producing catalysts, such as the various peroxide and azo compounds and also by heat or gamma radiation. For example, they can generally be homopolymerized or copolymerized at temperatures ranging from about $-10°$ C. to about 250° C. and more preferably from about 0° C. to about 100° C. Various pressures can be used, such as above or below or at atmospheric pressure and they can be polymerized on a batch basis or in a continous mode.

The various aromatic acrylamides of this invention have a particular utility as monomers for polymerization to various homopolymers as well as for copolymerization with other unsaturated hydrocarbons, such as, for example, methyl methacrylate, acrylonitrile, methacrylamide and vinyl chloride.

Representatives of the large variety of comonomers which can be used to form interpolymers with the amides of this invention include esters of unsaturated alcohols, esters of unsaturated acids, vinyl cyclic compounds, unsaturated ethers, unsaturated ketones, unsaturated amides, unsaturated aliphatic hydrocarbons, vinyl halides, esters of unsaturated polyhydric alcohols, unsaturated acids, unsaturated acid anhydrides, unsaturated acid chlorides and unsaturated nitriles.

Such comonomers include esters of unsaturated alcohols such as allyl, methallyl, crotyl, 1-chloroallyl, 2-chloroallyl, cinnamyl, vinyl, methvinyl, 1-phenallyl and butenyl; vinyl esters of saturated acids such as acetic, propionic, butyric, valeric, caproic and stearic; unsaturated acids such as crotonic, oleic, linoleic, linolenic, acrylic, alpha-substituted acrylic, including alkacrylic such as methacrylic, ethacrylic and propacrylic; and arylacrylic such as phenylacrylic; vinyl esters of saturated polybasic acids such as oxalic, malonic, succinic, glutaric, adipic, pimelic, suberic, azelaic and sebacic; unsaturated polybasic acids such as maleic, fumaric, citraconic, mesaconic, itaconic, methylene malonic, acetylene dicarboxylic acid and aconitic; and vinyl esters of aromatic acids such as benzoic, phenylacetic, phthalic, terephthalic and benzoylphthalic.

Further examples are the vinyl esters of saturated alcohols such as methyl, ethyl, propyl, isopropyl, butyl, isobutyl, sec-butyl, tert-butyl, 2-ethyl-hexyl, cyclohexyl and behenyl. Alkyl acrylates and methacrylates where the alkyl radical contains from 1 to about 30 carbon atoms are particularly useful.

Additional examples are vinyl cyclic compounds including (a) monovinyl aromatic hydrocarbons such as styrene, o-, m-, p-chlorostyrenes, -bromostyrenes, -fluorostyrenes, -methylstyrenes, ethylstyrenes, -cyanostyrenes, di-, tri- and tetra, etc., -chlorostyrenes, -bromostyrenes, -fluorostyrenes, -methylstyrenes, -ethylstyrenes, -cyanostyrenes, vinyl naphthalene, vinyl cyclohexane, vinyl furan, vinyl pyridine, vinyl benzofuran, divinyl benzene, trivinyl benzene, allyl benzene, N-vinyl carbazole, N-vinyl pyrrolidone and N-vinyl oxazolidone.

Other compounds include unsaturated ethers such as methyl vinyl ether, ethyl vinyl ether, cyclohexyl vinyl ether, octyl vinyl ether, diallyl ether, ethyl methallyl ether, allyl ethyl ether and allyl ether; unsaturated ketones such as methyl vinyl ketone and ethyl vinyl ketone; unsaturated amides such as acrylamide, N-methyl acrylamide, N-phenyl acrylamide, N-allyl acrylamide, N-methylol acrylamide and N-allyl caprolactam; unsaturated aliphatic hydrocarbons such as ethylene, propylene, butenes, butadiene, isoprene, 2-chloro-butadiene and alpha olefins; vinyl halides such as vinyl fluoride, vinyl chloride, vinyl bromide, vinyl iodide, vinylidene chloride, vinylidene bromide, allyl chloride and allyl bromide; unsaturated acids such as acrylic, methacrylic, propacrylic; unsaturated acid anhydrides such as maleic, citraconic, itaconic, cis-4-cyclohexene-1,2-dicarboxylic and bicyclo(2,2,1)5-heptene-2,3-di-carboxylic; unsaturated acid halides such as cinnamoyl, acrylyl, methacrylyl, crotonyl, oleyl and fumaryl and unsaturated nitriles, such as acrylonitrile, methacrylonitrile and other N-substituted acrylonitriles.

The practice of this invention is further illustrated by reference to the following examples which are intended to be representative rather than restrictive of the scope of the invention.

EXAMPLE I

To a reactor was charged 24 grams of acetophenone and 7.4 grams of acrylonitrile. The reactor was flushed with nitrogen and cooled in an ice bath to about 5°-8° C. To the mixture was added dropwise 13.7 grams of concentrated sulfuric acid (95-98%) with constant stirring, maintaining the reaction temperature between about 5°-10° C. The mixture was stirred for an additional 48 hours at about 25° C.

The reacted mixture was then diluted with 30 ml of a benzene-toluene solution (8/2 volume ratio), cooled in an ice bath, and neutralized with a cold aqueous sodium hydroxide solution (15%).

The mixture was transferred to a separatory funnel and diluted with more of the benzene-toluene solution. It was then washed three times with an aqueous sodium chloride solution (2%). The organic extract was dried with an anhydrous sodium sulfate, filtered and the filtrate poured into an excess of petroleum ether. A flocculent white powdery precipitate was filtered and crystallized from ethyl acetate-petroleum ether to yield 17 grams of diacetophenone acrylamide. The acrylamide product by standard CHN analysis, had the formula $C_{19}H_{19}O_2N$ and a melting point of 128°-129° C. on a Fisher-Jones block melting point apparatus. The melting point apparatus had not been standardized with a standard known compound having a similar melting point, but experience indicates the apparatus to be within about 1° C. to 2° C. accuracy in this temperature range.

EXAMPLE II

To a reactor was charged 22.2 grams of technical grade dypnone, 6.36 grams of practical grade acrylonitrile and 15 ml of benzene. The reactor was cooled with an ice bath to a temperature of about 10°-12° C. and 11.8 grams of cooled and concentrated sulfuric acid (95-98%) was slowly added dropwise while stirring and maintaining the temperature at about 10°-15° C. The mixture was then stirred for about 48 hours at about 25° C.

The reacted mixture was diluted with 100 ml of a toluene-benzene solution (3/7 weight ratio), cooled in an ice bath to about 5°-8° C. and neutralized with cooled aqueous sodium hydroxide (10%).

The mixture was transferred to a separatory funnel, the aqueous layer discarded and the organic layer extracted four times with an aqueous sodium chloride solution (4%). The organic solution was dried with anhydrous sodium sulfate, filtered and the filtrate concentrated to yield crystals of diacetophenone acrylamide (12.5 grams), having a melting point of about 128°-129° C., measured with the Fisher-Jones apparatus.

EXAMPLE III

A portion of the diacetophenone-acrylamide prepared according to Example I was mixed with polyvinylchloride and submitted to a weather-ometer test to examine its resistance to degradation in the presence of ultraviolet light. In one sample the ratio of diacetophenone acrylamide to polyvinylchloride was 0.5/100 (Sample A) and in another, the ratio was 1.5/100 (Sample B). The results of the test upon the samples as well as polyvinylchloride with no ultraviolet absorber added is shown in the following table.

Table

| Polymer | 800 Hours | 1000 Hours |
|---|---|---|
| Polyvinylchloride (PVC) | Slight surface craze | Spotted; very brittle and dark color |
| PVC-diacetophenone acrylamide (0.5/100) | No change | Light spotting and brittle |
| PVC-diacetophenone acrylamide (1.5/100) | No change | Light spotting and brittle |
| PVC-diacetophenone acetamide (0.5/100) | No change | Brittle and spotted |
| PVC-diacetophenone acetamide (1.5/100) | No change | Light spotting and brittle |

EXAMPLE IV

To a reactor was charged 4.9 grams of acetonitrile and 24 grams of acetophenone. The solution was cooled in an ice bath and 19.6 grams of concentrated sulfuric acid (95%) slowly added dropwise to the mixture while maintaining its temperature below 20° C. The reaction was continued for about 20 hours at about 25° C. and the reaction product dispersed in about 60 ml of benzene, cooled in an ice bath, and neutralized with cooled aqueous sodium hydroxide solution. The mixture was poured into a separatory funnel, and the organic layer diluted with 250 ml of a benzene-methylene chloride mixture (95/5) and washed neutral with an aqueous sodium chloride solution (3-5%). The organic layer was filtered, concentrated and poured into an excess of petroleum ether where a flocculent white precipitate formed. The precipitate was washed with petroleum ether and crystallized with ethyl acetate-petroleum ether to yield 19.44 grams of product having a melting point of about 98°-100° C., measured with the Fisher-Jones apparatus.

The product was identified as diacetophenone-acetamide by analysis for the formula $C_{18}H_{19}O_2N$, its ultraviolet spectra measured in ethanol and its infrared spectra showing band assignments at 3.04, 5.95 and 6.05 microns.

EXAMPLE V

A polymer was prepared by dissolving 10 grams of diacetophenone-acrylamide in 85 grams of distilled benzene, followed by adding thereto 0.3 gram of azobisisobutyronitrile and agitating at about 50° C. for about 43 hours. The viscous solution was poured in excess methanol, resulting in a white precipitate. The precipitate was filtered, washed with methanol and Soxhlet extracted with methanol for 12 hours. The extracted polymer was dried at 40° C. in vacuum to obtain a yield of 9.5 grams of poly(diacetophenoneacrylamide) having a glass transition temperature of 104.5° C. and an inherent viscosity of 0.38 in cyclohexanone at 30° C.

EXAMPLE VI

A polymer was prepared by adding 4 grams of diacetophenone-acrylamide to a pyrex tube and sealed under a vacuum, immersing the sealed tube in silicone oil at 141° C. for 24½ hours, crushing the resulting polymer, and dissolving the chlorobenzene-acetone mixture, filtering and evaporating the filtrate to dryness. The resulting polymer was Soxhlet extracted with boiling methanol, and the remaining white powder dried under vacuum to yield 2.7 grams of poly(diacetophenone-acrylamide).

EXAMPLE VII

A polymer was prepared by dissolving 6.2 grams of diacetophenone-acrylamide in 36 grams of distilled benzene, bubbling nitrogen through the solution for 2 minutes, and then radiation polymerized with 0.94 Mrad/hr for 3 hours at 60° C. The viscous mixture was poured into excess methanol, resulting in a white precipitate. The precipitate was washed with methanol, filtered, Soxhlet extracted with methanol and dried under vacuum to yield 4.2 grams of poly(diacetophenone-acrylamide) having a glass transition temperature of 101° C. and an inherent viscosity of 0.35 in cyclohexanone at 30° C.

EXAMPLE VIII

A polymer was prepared by free radical suspension copolymerization of vinyl chloride and diacetophenone-acrylamide using Methocel (a trademark of the Dow Chemical Company representing hydroxy propyl cellulose) and Lupersol 11 (a trademark of Lucidol Corporation representing t-butyl peroxy pivalate) as the initiator. The copolymerization was conducted in aqueous suspension in an enclosed reactor at a temperature of about 50° C. with continuous stirring. The recipe was as follows:

| | | |
|---|---|---|
| Vinyl Chloride | 99.5 | parts |
| Diacetophenone-acrylamide | 0.5 | part |
| Methocal 60 Hg-50 | 0.22 | part |
| Lupersol 11 | 0.15 | part |
| Distilled water | 285.7 | parts |

EXAMPLE IX

A polymer was prepared by dissolving 1.5 gram of diacetophenone-acrylamide and 13.5 grams of acrylonitrile in 20 grams of benzene, adding 0.3 gram of azobisisobutyronitrile to the mixture and continuously agitating for 24 hours at about 51°-52° C. The mixture was extracted with methanol yielding a 14.1 gram white powdery polymer, vacuum dried at 35° C. The polymer had a glass transition temperature of 107° C. as compared to a reported glass transition temperature of 95° C. for polyacrylonitrile.

EXAMPLE X

A polymer was prepared by mixing 1.5 gram of diacetophenone-acrylamide and 13.5 grams of methacrylamide mixing with 35 grams of 5-butylalcohol and 10 grams of ethyl acetate followed by adding thereto 0.3 gram of azobisisobutyrnitrile and placing in a water bath for 24 hours at 51°-52° C. The product was extracted with water and then with methanol to yield a white copolymer weighing 13.3 grams.

EXAMPLE XI

A polymer was prepared by mixing 1.5 gram of diacetophenone-acrylamide and 13.5 grams of methyl methacrylate with 20 grams of benzene, mixing therewith 0.3 gram of azobisisobutyronitrile and placing at a constant temperature water bath at 60° C. for 23 hours with agitation. The resulting mixture was poured into methanol to yield a precipitated polymer which was extracted with additional methanol yielding a white polymer dried under vacuum to yield 13.8 grams having a glass transition temperature of 120.5° C.

Thus, in this specification and examples it is shown that various ketones, particularly aromatic ketones, can be used to prepare the unique amides of this invention. More specifically, it can be seen that these ketones can more conveniently be expressed as ketones having the structure:

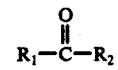

where its $R_1$ radical is, in reality, the $R_1$ and $R_4$ radicals and $R_2$ is the $R_2$ radical of the applicant's amide. It is preferred that $R_2$ is selected from methyl, ethyl, propyl and —$CH_2X$, where X is a halogen, preferably chlorine. $R_1$ is an aryl radical required for the corresponding $R_1$ and $R_4$ aryl radicals of the applicant's amide.

While certain representative embodiments and details have been shown for the purpose of illustrating the invention, it will be apparent to those skilled in this art that various changes and modifications may be made therein without departing from the spirit or scope of the invention.

What is claimed is:

1. An amide selected from the group consisting of N-(1,3-diphenyl-1-methyl-3-oxo-propyl)acetamide, N-(1,3-diphenyl-1-methyl-3-oxo-propyl)4'-(salicyloyl)benzamide, N-(1,3-diphenyl-1-methyl-3-oxo-propyl)benzamide and amides having the structure:

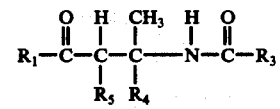

where $R_3$ is selected from methyl, ethyl, propyl, pentyl, hexyl, heptyl and octyl radicals, where $R_1$ is a radical selected from 2'-hydroxy benzophenone, 4'-octyl benzophenone, 2'-hydroxy-4'-octyl benzophenone and ortho hydroxy-p-octyl phenyl, $R_4$ is selected from the radicals of $R_1$ and from aliphatic hydrocarbon radicals having 1-8 carbon atoms and $R_5$ is selected from hydrogen and methyl radicals.

2. An amide of claim 1 selected from the group consisting of N-(1,3-diphenyl-1-methyl-3-oxo-propyl)4'-(salicyloyl)benzamide and N-(1,3-diphenyl-1-methyl-3-oxo-propyl)benzamide.

3. The amide compound N-(1,3-diphenyl-1-methyl-3-oxo-propyl)acetamide.

* * * * *